United States Patent [19]

Fujita et al.

[11] Patent Number: 4,543,280
[45] Date of Patent: Sep. 24, 1985

[54] HEAT RESISTANT OVENABLE PAPERBOARD

[75] Inventors: Yuji Fujita; Keizo Wakasugi; Ryoichi Kaneko, all of Toyama, Japan

[73] Assignee: Kohjin Co., Ltd., Tokyo, Japan

[21] Appl. No.: 586,058

[22] Filed: Mar. 5, 1984

[30] Foreign Application Priority Data

Jan. 27, 1984 [JP] Japan .............................. 59-012028

[51] Int. Cl.[4] .................... B65D 11/02; B32B 5/16; B32B 27/10

[52] U.S. Cl. ...................................... 428/35; 428/328; 428/483; 428/342; 428/514; 428/522; 428/414; 428/475.2; 428/474.7; 220/458; 427/361; 427/365; 264/176 R

[58] Field of Search ............... 428/514, 35, 522, 483, 428/328, 342

[56] References Cited

U.S. PATENT DOCUMENTS

| | | | |
|---|---|---|---|
| 4,241,143 | 12/1980 | Ashie et al. | 428/514 |
| 4,336,345 | 6/1982 | Lewis et al. | 428/514 |
| 4,343,858 | 8/1982 | Thompson | 428/514 |
| 4,418,119 | 11/1983 | Morrow et al. | 428/514 |

Primary Examiner—Patricia C. Ives
Attorney, Agent, or Firm—Ladas & Parry

[57] ABSTRACT

A pigmented coating composition comprising a pigment consisting of kaolin clay or $TiO_2$ or the mixture thereof, or a pigment wherein $Al(OH)_3$ is further blended therein, and also comprising an adhesive consisting of crosslinkable ethylenevinylacetate copolymer aqueous emulsion combined with a crosslinker or of crosslinkable polyacrylate copolymer aqueous emulsion combined with a crosslinker of water-soluble polymaidepolyurea resin and the pigment above and the mixed adhesive are formulated in a ratio of 85:15 to 70:30 as coating composition. This pigmented adhesive composition is primed on the substrate paperboard. Thereby finished ovenable paperboards, being capable of retaining the brightness at least 45% against the heat-treatment of 250° C. for 20 minutes, is free from scorch even in an electrically heating oven and is excellent in adhesion to extrusion-laminating plastic layer.

9 Claims, 1 Drawing Figure

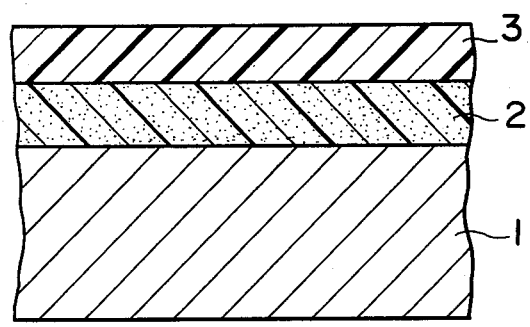

HEAT RESISTANT OVENABLE PAPERBOARD

BACKGROUND OF THE INVENTION

This invention relates to an ovenable paperboard to be molded, for instance, into trays or similar food containers.

Referring generally to conventional ovenable paperboards, they are made of sized paperboard, derived from bleached sulfate pulp, on which polyethylene terephthalate (hereinafter noted as PET) or other heat-resistant polymer is extrusion-laminated. Paperboards thus prepared are molded into trays or light containers for food, in which frozen food is packed, and sold in public. Consumers who have bought them are allowed to put trays, as they are or without need of repacking to oven heatable containers, into an electrical oven or a microwave irradiation-type cooking range where frozen foods are thawed and heat-cooked.

In the process as mentioned above, if an oven uses a different heating system from microwave, such as the type of electricity, the defects of darkening discoloration, emission of odor and brittling due to scorching exposure to heat effect take place conspicuously at flange parts of containers as compared with portions thereof covered with the loaded food. These defects give unfavorable appearance, unappetizing feeling and inconvenience in subsequent hand-handling ascribed to brittled flange. The term "flange" will be understood with reference to the specification of U.S. Pat. No. 4,147,836 and its accompanying drawings.

An object of this invention is to provide an ovenable paperboard with so improved heat resistance as to be free from conspicuous scorch at flange parts as mentioned above.

Another object of this invention is to provide an ovenable paperboard where the extrusion-laminated plastic layer is excellently bonded with the substrate paperboard.

A further object of this invention is to provide a process for manufacture of ovenable paperboards having thereon a pigmented adhesive layer, excelling in heat-resistance and adhesivity, opon which an unpigmented natural plastic layer is applied by extrusion lamination.

SUMMARY OF THE INVENTION

As mentioned hereinbefore, a paperboard of this invention provides a pigmented adhesive layer which is capable of retaining at least 45% of the white brightness after undergoing the heat treatment of 250° C. for 20 minutes. And for the sake of performing the same, said pigment is formulated by choice of kaolin clay or titanium dioxide (hereinafter noted as $TiO_2$) or the either one in addition to aluminum hydroxide (hereinafter noted as $Al(OH)_3$ in the range of less than equal amount, and said adhesive is formulated by combination of a crosslinkable vinylpolymer and a crosslinker therefor. Specifically, crosslinkable ethylenevinylacetate copolymer aqueous emulsion (hereinafter noted as crosslinkable EVA) and a crosslinker therefor or by combination of crosslinkable acrylic acid ester aqueous emulsion (hereinafter noted as crosslinkable AA) and its crosslinker of water-soluble polyamidepolyurea resin (hereinafter noted as AU resin), wherein the former crosslinkable AA and the crosslinker AU resin are mixed on solid basis in the range of 85/15 to 70/30 by weight. And further in the pigmented adhesive composition, said chosen pigment and said formulated adhesive are in a ratio on solid basis in the range of 85/15 to 70/30 by weight.

Referring to the process for producing ovenable paperboards of this invention, paperboards are first primed by the aqueous pigmented adhesive composition and dried, then undergo the extrusion-lamination with such a heat-resistant thermoplastic natural polymer as PET, methylpentene polymer. Accordingly, finished paperboards of this invention consist essentially of three layers as shown in the attached drawing; the substrate paperboard 1, the primed pigmented adhesive 2 and topped plastic 3.

DETAILED DESCRIPTION OF THE INVENTIVE CONSTITUENTS

As mentioned hereinbefore, this invention relates to particular paperboards featuring the capability of retaining white brightness at least 45%, preferably not less than 50% of the same value over heat treatment of 250° C. for 20 minutes.

In order to attain the objective performance above, this invention provides the coating with a particular pigmented adhesive composition on the substrate paperboard. If a pigment is blended into a paperboard at the paper-making stage thereof, the paperboard becomes weak in strength and poor in adhesion to a topping polymer.

Further, referring to another alternative method for providing a pigment, viz. the method of blending it into a laminating polymer. In this method, however, the significant heat discoloration takes place necessarily for the blend range at and below 5%. And for the range above 5%, operation of extrusion lamination becomes difficult and further bonding of the extruded layer with the paperboard becomes weak. Referring specifically thereto, in the case of 5% blend of $TiO_2$ into the laminating polymer, the retention of brightness is about 40% as a result of the same heat-treatment as mentioned above and apparent darkening effect comes forth. In the case of 8% $TiO_2$ blend, the operation of extrusion lamination becomes unsuitably difficult to industrial application and further laminating bond to paperboard becomes low, often less than 40 g/15 mm width. As for the adequate adhesion strength to be provided by plastic lamination of this invention, the requirement lies in that the T delamination test should give not less than 40 g/15 mm width, preferably not less than 70 g/15 mm.

Referring to the pigment for this invention, kaolin clay or $TiO_2$ or a mixture thereof is suited and it is to be noted as to the use of aluminum hydroxide ($Al(OH)_3$) that this compound is intensely hydrolyzed in the temperature range of 200° C. to 350° C. and therewith provides large endothermal effect, thereby the surface being heated is inhibited with respect to temperature rise and therefore the superior resistance to heat-discoloration is acquired. However, if the pigment is all replaced by $Al(OH)_3$, dehydrating water generating therefrom, when heated by molten polymer in the process of extrusion lamination, loses channels for stripping out. Thereby the delamination of laminated polymer film will result. In view of the possible difficulty above, the amount of $Al(OH)_3$ should be limited within 50%, preferably within 30%, of the total pigment by weight.

Referring to adhesives of this invention, in consideration of applications for food package, the following are primary requirements for use in this invention.

1. As food contact adhesive, any harmful substance, such as heavy metals, free phenol, free formalin, or any odor emitting substance should not be contained.

2. Sufficient resistance to discloration due to heating.

3. Adequate adhesion to a laminating polymer film. In particular, at a high moisture content, such as 15%, and also at the heat-treatment of 250° C. for 20 minutes, no delamination of the laminated polymer film should arise.

4. Good compatibity or blendability with pigment.

In view of requirements above, this invention employs, as mentioned before, the combination of crosslinkable EVA emulsion and the crosslinker therefor or the combination of crosslinkable AA emulsion and the crosslinker of AU resin.

Referring to the crosslinkable EVA emulsion, crosslinkable ethylene-vinylacetate copolymers are defined to indicate a series of copolymers which are derived from vinyl acetate and ethylene, with a ratio of from 60–95 to 40–5 parts, and additionally not more than 7 parts of unsaturated carboxylic acid having 3–17 carbon atoms, for instance, acrylic acid, methacrylic acid, itaconic acid, maleic acid or fumaric acid wherein, if a dibasic acid is involved, it may be a half-ester having the alkyl portion made of 1-8 carbon atom(s), and further additionally not more than 15 parts of an acrylamide compound represented by $CH_2=CHCONHCH_2OR$ wherein R indicates the alkyl portion having 1–10 carbon atom(s), for instance, N-methoxymethyl acrylamide, N-n-butoxymethyl acrylamide, N-methylol acrylamide-2-ethylhexyl ether.

A crosslinker or modifier to be combined with the EVA copolymer above is, for example, a polyalkylenepolyamine, such as diethylenetriamine or triethylenetetramine; polyethyleneimine; polyaminepolyamide, viz. a condensate of polyalkylenepolyamine and free fatty acid from drying, undrying oil or ester thereof with lower alcohol; epoxy resins, viz. an emulsifiable epoxy resin derived by condensation from a compound having an epoxy group like epichlorhydrin and an active hydrogen-containing compound, like a compound having a phenolic OH, carboxylic-COOH, amine-$NH_2$ group.

Referring to the formulation amount for a crosslinker above, if an epoxy resin is used as crosslinker, it may be 5–60 parts with respect to 100 parts of the EVA copolymer on solid weight basis and, in the case of another crosslinker than the epoxy resin, it may be 1–40 parts. Then two different formulations which were separately prepared using the epoxy and another one may be blended at the time of application. These adhesives as described hereinbefore are known by publications of, for instance, Japanese Unexamined Patent Publications Nos. Sho 56(1981)-86976, Sho 56-86978.

Referring to the crosslinkable polyacrylate emulsion (AA resin), it is a copolymer comprising acrylic acid ester, generally lower alkyl ester, and at least one of carboxyl group-containing vinyl monomer; for instance, acrylic acid, methacrylic acid, hydroxyl group-containing monomer, for instance, hydroxyethylmethacrylate, amino or amide group-containing monomer, for instance, acrylamide, N-methylolacrylamide, and the like. And the AA resin will be crosslinked with any of melamineformaldehyde resin, ureaformaldehyde resin and the like aminoplast or epoxy resins. Then this invention employs polyamidepolyurea (AU resin) as crosslinker for the AA resin.

Said AU resin is prepared by reaction of urea, polyalkylenepolyamine, such as triethylenetetramine or diethylenetriamine and a dibasic acid such as adipic acid to yield polyamidepolyurea followed by reaction with formaldehyde. The AU resin is advantageous in minimal emission of formaldehyde in coating application thereof. The production thereof is known by Japanese Unexamined Patent Publication, No. Sho 55(1980)-31837.

Referring to the combination of the crosslinkable AA emulsion and AU resin, the crosslinker polyamidepolyurea is preferred to be present in an amount of 10–30%, particularly 15–30%. Above 30%, the resistance of heat-discoloration will be impaired and, because of rapid viscosity rise, pot life time after mixing thereof gets so short as to be impractical, and below 15%, in particular below 10%, resultant adhesion is insufficiently low.

It is to be noted here that EVA copolymers unmodified with reactive groups or self-crosslinkable AA resins are excellent in the resistance to heat-discoloration, but the pigmented adhesive layer formed by adhesives above provides the laminated film with so weak bonding strength that adhesives of these types can not be employed in this invention.

Referring to the combination ratio of pigment/adhesive, it is much related to the resistance to heat-discoloration and the ratio range of 85/15 to 70/30 is preferred wherein the more pigment provides the better resistance to heat-discoloration. However, a higher pigment content than 85/15 noted above weakens the strength of adhesive layer and resultantly the bond with the laminating film. A lower pigment content than 70/30 impairs not only the resistance to heat-discoloration, but also blocking trend.

As for the coating application rate in this invention, 10–30 g/m$^2$ is preferred, as a coating rate below 10 g/m$^2$ causes the heat-discoloration and a coating above 30 g/m$^2$ causes cracks in the pigmented adhesive layer in the process of molding into containers.

Referring to drying after coating, any conventional process for drying may be employed in this invention, such as by steam, heated air, hot gas or electrical heater. A drying temperature may be set so that coated adhesive will not melt. Accordingly, about 130° C. is preferred.

The pigmented adhesive layer thus finished will usually undergo the flattening treatment on surface by supercalendaring, but this flattening treatment is advantageously omitted so that unevenness on freshly coated surface may remain when the subsequent lamination with thermoplastic polymer is scheduled, because the unevenness exhibits anchoring effect to extrusion film and chemical actions of adhesive is promoted to produce more effective bonding to the film. Referring further thereto, in the case of molding deep-drawn containers, normally the substrate paperboard is provided with enhanced moisture, about 8–15%, but suitably formulated adhesives in this invention can avoid, under such a moistened condition, such troubles as shortage in bonding power, cracking at molding and delamination at heat-treatment.

Referring to the substrate paperboard, any of acidic or neutral, flame-retardant paper may be used, among which the neutral paper is desired to obtain the better resistance to heat-discoloration. As for the neutral paper, preferred is the sized paper which is manufactured from bleached sulfate pulp and of which basis weight is about 150–500 g/m$^2$, and sized by neutral sizing agents to the extent the sizing degree thereof, according to JIS-P-8122 (Stoeckgt sizing degree) is above 500 seconds and that the value thereof is above $0.008 \times B^2$ wherein B is the basis weight denoted by $g/m^2$ unit. Said neutral sizing agents are those which will be fixed without using acidic Alum, specifically, they are reaction products of maleic acid rosin or maleic acid petroleum resin or the like and polyalkylenepolyamide and epichlorohydrine, methylstyrene-vinylpyridine copolymer, polyalkylenepolyamine-epichlorhydrine resin, cationic polyacrylate-styrenemaleic copolymer resin or the like. It is to be noted that the paper as sized by neutral sizing agents without respect to Alum is neutral, not acidic, thereby it is called neutral paper or neutral sized paper.

Referring to the laminating polymer, the heat resistance is of course required and preferred are unpigmented natural thermoplastic polyester, heat-resistant polyamides, polymethylpentene. Specially PET is suited to mold ovenable trays.

The laminated paperboard of this invention, as understood by description hereinbefore, improves not only the thermal durability at flange part of a tray container so that no significant scorch will come forth under thermal cooking conditions by any home ovens, but also improves moldability into containers. Because coated and laminated paperboards as produced by this invention possess such excellent merits that they may be applied, different from the application as ovenable trays, to building materials after embossing or corrugating treatment for making use of heat-resistance thereof. Further, heat-resistant label, tape and the like may be prepared.

EXAMPLES OF THE INVENTION

This invention will be explained in the following based on examples, but the following examples should not be construed as being limiting.

Main materials which will be used in the examples are listed with reference to supply sources thereof as follow:

(1) Crosslinkable polyacrylate made by Hoechst Gosei KK under Movinyl 730
(2) Self-crosslinkable polyacrylate made by the same as above under Movinyl 987
(3) Ethylene-vinylacetate, the same as the above under Movinyl 181E
(4) Two part adhesive of crosslinkable ethylene-vinylacetate copolymer and crosslinker thereof, made by Denki-Kagaku-Kogyo KK under Denka EVA TEX H-201
(5) Watersoluble polyamidepolyurea resin, made by Sumitomo Kagaku Kogyo KK under Sumirez Resin 636
(6) Titanium dioxide, made by Ishihara Sangyo KK under Tipaque R-820
(7) Aluminum hydroxide, made by Showa Keikinzoku KK under Higilite-H42

Some test methods employed in measurements are explained below;

Heat-Resistance of Adhesion

Samples are stored in a heated air-convection box at 250° C. for 20 minutes and then put out to a room temperature area where film delamination status is observed. $\times$ ... delaminated, $\Delta$ ... partly delaminated, o ... no delamination.

Peeling Test by Pressure Sensitive Tape

A pressure sensitive tape is adhered firmly on some coated area and is quickly peeled off when the degree of coated portion peeled with the tape is evaluated. $\times$ ... wholly peeled, $\Delta$ ... partly peeled, o ... no peeling

White Brightness as Resistance to Heat-Discoloration

A certain heating temperature is set in a heated air-convection box wherein samples are stored for a preset time. The brightness is, according to TAPPI STANDARD T452, measured by the digital colorimeter ND101D, made by Nippon Denshoku Kogyo, and is denoted in % basis. For reference, a thick paper made of only bleached sulfate pulp has the whiteness about 80% and examples of coated paperboard have about 80-90% in the brightness.

Adhesive Strength of Polyester Laminated Film

A strip laminate sample, where PET was extrusion-laminated on pigmented adhesive layer, is first conditioned with respect to moisture content and then cut to prepare for peeling test pieces 15 mm wide. A test piece is delaminated a little at an edge so that delaminated two flaps may be caught by chucks equipped with the measuring machine. The test piece is arranged in the machine so that the delaminated film is kept vertically and non delaminated portion may be horizontal, viz. 90° or the inverse T shape may be configured. Then the movable chuck is vertically moved at 100 mm/minute, by which peel-off strength is measured.

EXAMPLES 1-3, COMPARATIVE EXAMPLES 1-2

80 parts of $TiO_2$ and 20 parts of $Al(OH)_3$, mixed pigment, were dispersed into water with 0.19 part of sodium pyrophosphate to yield a pigment slurry containing 65% solid.

Then five mixtures having each a different ratio of the crosslinkable AA/AU resin were prepared at 100/0, 90/10, 85/15, 80/20, 70/30 on solid basis.

The pigmented adhesive liquid was prepared by mixing the pigment slurry/adhesive liquid = 80/20 on solid basis which was coated by a Meyer bar coater at the coating application rate of 15 $g/m^2$ (dry basis) on the neutral sized paper having 350 $g/m^2$ which had been sized by the styrene-maleic acid based sizing agent at the sizing degree of 1500 seconds. The coated paper was dried about at 130° C. Thereafter molton PET resin, being extruded from T die, was extrusion-laminated on the dried coated papers with the laminating thickness of 35 microns. Thereby five finished samples were prepared. The properties measured are shown in Table 1.

EXAMPLE 4

The pigment slurry used in Examples 1-3 and the adhesive consisting of the crosslinkable EVA emulsion and the crosslinker were mixed at the ratio 80/20 on solid basis, and then the coating of the pigmented adhesive liquid and the extrusion lamination of PET were conducted in the same manner as in example 1. Test results on products are shown in Table 1.

COMPARATIVE EXAMPLES 3-4

The adhesive was prepared in two formulations having self-crosslinkable polyacrylate/AU resin = 100/10 and 85/15. The pigment slurry used in examples 1-3 was mixed with the above two adhesives respectively at the ratio of pigment/adhesive=80/20 on the solid basis to prepare two coating compositions. Using said two coating compositions and with the same procedures as in examples 1-3, laminated papers were prepared and test results thereon are shown in Table 1. It is to be noted that the term of "self-crosslinkable" means that the polymer concerned, instead of reacting with a different compound, can start a crosslinking reaction for itself.

COMPARATIVE EXAMPLES 5-6

Except that the adhesive used in comparative example 1 was replaced by EVA copolymer emulsion having no modifying reaction groups and AU resin, the same procedures were otherwise conducted to prepare laminated papers, of which test results are shown in Table 1.

linkable AA/AU=80/20 on solid basis was combined with said six pigments so that pigment/adhesive ratio based on solid becomes 80/20 in the coating composition. Thus prepared pigmented adhesives were coated and laminated, thereby six samples were obtained. Properties thereof are shown in Table 2.

EXAMPLE 9

In this example, only kaolin clay was used as pigment, replacing pigment compositions employed in examples 5-8. Results are shown in Table 2 including related other examples.

TABLE 2

| | example 5 | example 6 | example 7 | example 8 | comparative ex. 7 | comparative ex. 8 | example 9 |
|---|---|---|---|---|---|---|---|
| $TiO_2/Al(OH)_3$ ratio | 10/0 | 8/2 | 7/3 | 5/5 | 3/7 | 0/10 | only clay |
| heat dis- 250° C. - 20 min | 60.1 | 60.1 | 58.9 | 51.8 | 49.3 | 40.6 | 57.8 |
| coloration 300° C. - 5 min | 50.8 | 50.3 | 49.8 | 42.8 | 39.7 | 28.8 | 45.3 |
| (brightness %) | | | | | | | |
| delamination by heat treatment (250° C. - 20 min) | o | o | o | Δ | x | x | o |

It is apparent from Table 2 that the heat discoloration and the delamination by heat-treatment are enhanced in the case where the pigment is only kaolin clay or where the ratio of $TiO_2/Al(OH)_3$ resides in 100/0 to 50/50.

TABLE 1

| adhesive and formulation | | comparative ex. 1 | comparative ex. 2 | example 1 | example 2 | example 3 | ex. ample 4 crosslinkable EVA/ crosslinker | comparative ex. 3 self-crosslinkable acrylate/AU | comparative ex. 4 | comparative ex. 5 | comparative ex. 6 |
|---|---|---|---|---|---|---|---|---|---|---|---|
| | | \multicolumn{5}{c}{crosslinkable AA/AU} | | | | \multicolumn{2}{c}{EVA/AU} |
| | | 100/0 | 90/10 | 85/15 | 80/20 | 70/30 | | 100/0 | 85/15 | 100/0 | 85/15 |
| heat-dis-color-ation (brightness %) | 250° C. - 20 min | 68.8 | 67.1 | 67.0 | 66.9 | 66.0 | 63.2 | 64.9 | 58.5 | 60.9 | 61.5 |
| | 300° C. - 5 min | 54.4 | 51.9 | 51.5 | 49.5 | 49.0 | 52.2 | 54.9 | 51.8 | 49.9 | 42.7 |
| PET film bond (g/15 mm) | heat treatment (250° C. - 20 min) | x | Δ | o | o | o | o | x | x | x | x |
| | high moisture content (moisture 15%) | 0 | 15 | 118 | 120 | 120 | 115 | — | — | — | — |
| | normal moisture content (moisture 8%) | 10 | 30 | 125 | 126 | 130 | 125 | — | — | — | — |
| pot life of * coating composition (seconds) (at 40% solid) | 0 hr | — | — | 18.5 | 18.5 | 40 | | | | | |
| | 15 hrs | — | — | 35.5 | 48.0 | gel | | | | | |
| | 24 hrs | — | — | 55.0 | 60.0 | gel | | | | | |

Note: * viscosity by #4 Ford Cup

It is understood by results shown in Table 1 that two kinds of adhesives of this invention, viz. the formulation of crosslinkable AA/AU resin where solid weight ratio is 85/15-70/30 and the formulation of crosslinkable EVA, are capable of providing at least 45% of the whiteness after heat-treatment and that the PET lamination gives the peeling strength above 70 g/15 mm with excellent heat-resistance and adhesivity.

EXAMPLE 5-8, COMPARATIVE EXAMPLES 7-8

Six pigment slurries having different mixing ratios of $TiO_2/Al(OH)_3$ at 10/0, 8/2, 7/3, 5/5, 3/7, 0/10 on solid basis were prepared by the method used in Examples 1-3. Then the adhesive with the formulation that cross-

EXAMPLES 10-13, COMPARATIVE EXAMPLES 9-11

According to experimental conditions in example 1, three pigmented adhesive liquids were prepared with difference in pigment/adhesive ratio on solid basis at 90/10, 80/20, 70/30 wherein the adhesive contained the crosslinkable AA/the AU=80/20 on solid basis. These three kinds of pigmented adhesive liquids were coated on neutral sized papers having 350 g/m² weight basis at four coating rates of 7, 10, 15, 23 g/m². Thus coated papers obtained were extrusion-laminated with 35 microns thick by PET being extruded from T die. Test results on seven samples in the above are shown in Table 3.

Data in Table 3 show the trend that the more coating rate with the same pigmented adhesive liquid gives the better resistance to heat discoloration and that, with respect to peel test by pressure sensitive tape, the less coating rate and the less pigment/adhesive give the stronger peel resistance. Consequently, the preferred range of pigment/adhesive to maintain compatible satisfactions with above two requirements resides in 85/15 to 70/30, particularly in the proximity of 80/20, from viewpoint of actual applications. And, as for the coating rate, preferred is the range of 10–30 g/m$^2$, more preferably 10–20 g/m$^2$, where excellent film bond is obtained even under moistened condition.

TABLE 3

|  |  | comparative ex. 9 | comparative ex. 10 | example 10 | example 11 | example 12 | example 13 | comparative ex. 11 |
|---|---|---|---|---|---|---|---|---|
| pigment/adhesive ratio |  | 90/10 | 80/20 | 80/20 | 80/20 | 80/20 | 70/30 | — |
| coating rate (g/m$^2$) |  | 15 | 7 | 10 | 15 | 23 | 15 | — |
| heat-discoloration (brightness %) | 250° C. - 20 min | 53.8 | 44.1 | 49.3 | 50.6 | 53.2 | 47.3 | 23.6 |
|  | 300° C. - 5 min | 34.9 | 29.7 | 32.0 | 34.2 | 36.7 | 32.4 | 10.0 |
| peel test by tape on coated area |  | Δ | o | o | o | o | o | — |
| high moisture condition (13.8%) PET film adhesion (g/15 mm) |  | 55 | 105.1 | 98.4 | 110.5 | 95.7 | * break in paper | 20 |
| normal moisture condition (7.8%) PET film adhesion (g/15 mm) |  | 50 | 105 | 102 | 101.3 | 86.3 | * break in paper | 100 |
| heat delamination 250° C. - 20 min |  | Δ | o | o | o | o | o | o |

Note: *indicates the break happened inside of the paper

EXAMPLE 14, 15

The PET extrusion-lamination was conducted on coated papers, as prepared in example 1, with difference of previous supercalendaring treatment and the omission thereof. The film bond strengths are compared in Table 4.

TABLE 4

|  |  | smoothness (sec) | film bond (g/15 mm) |
|---|---|---|---|
| example 14 | no treatment | 7 | 118 |
| example 15 | super calendaring treatment | 40 | 65 |

Note: conditions at supercalendaring treatment were as follows; paper moisture 10%, pressure = 50 kg/cm$^2$ × 4 times Table 4 shows that the sample which has not undergone the supercalendaring excels in film bond strength.

EXAMPLE 16, COMPARATIVE EXAMPLE 12

Finished laminated-coated papers and laminated papers without intermediate pigmented adhesive coating are compared. These two kinds of papers were conditioned to have 9% moisture. Thereafter these were punched and then molded into deep drawn trays having the volume of 250 ml by the press molding machine where the paper temperature was 158° C. and the film temperature was 70° C. Therein 200 g of commercially selling gratin was packed and heat-cooked in an oven toaster, made by Matsushita Denkisangyo Co. under the name of National Oventoaster NT-8501,using the dial at 10 for 20 min. Shown in Table 5 are scorching discoloration over the cooking time mentioned above and the same discoloration with the deep drawn trays which were subjected to the cooking condition with no loading food.

TABLE 5

| sample used |  | example 16 laminated paper made in ex. 1 | comparative example 12 laminated papers with no intermediate |
|---|---|---|---|
| discoloration at flange (brightness %) | 250° C. - 20 min | 51 | 18.9 |
|  | 300° C. - 5 min | 32 | 5.8 |
| delamination under unloaded condition (250° C. - 20 min.) |  | O | O |
| discoloration under gratin cooking condition (dial at 10, 20 min.) |  | O | X |
| tray moldability |  | O | O |

Table 5 shows that laminated papers of this invention excel in inhibition of discolorating trend and film adhesion, further moldability.

EXAMPLE 17, COMPARATIVE EXAMPLE 13

The pigment mixture consisting of TiO$_2$ 70 parts and Al(OH)$_3$ 30 parts was dispersed into water with 0.19 part of sodium pyrophosphate, thereby prepared was the pigment slurry having the solid content of 65%.

Then the adhesive liquid comprising crosslinkable AA/AU resin=80/20 on solid basis was added to said pigment slurry to prepare the coating composition having the ratio of pigment/adhesive=70/30. This pigmented adhesive was applied at the coating rate of 15 g/m$^2$ on commercial flame-retardant papers made by Toyo Pulp Co. under the name of Cosmo, having 52 g/m$^2$ weight and then dried at about 130° C. Coated papers thus obtained and papers with no treatment made were tested with respect to their resistance to heat-discoloration. Results are shown in Table 6.

TABLE 6

|  |  | comparative example 13 no treatment | example 17 coat treatment |
|---|---|---|---|
| heat-discoloration | 250° C. - 20 min. | 33.5 | 55.4 |
|  | 250° C. - 40 min. | 28.5 | 51.7 |
|  | 300° C. - 5 min. | 22.9 | 45.0 |

TABLE 6-continued

| | | comparative example 13 no treatment | example 17 coat treatment |
|---|---|---|---|
| (brightness %) | 300° C. - 20 min. | 13.9 | 19.7 |

Table 6 shows that coated papers of this invention have excellent inhibitory effects on heat-discoloration.

We claim:

1. An ovenable paperboard comprising a paperboard substrate coated with a pigmented adhesive layer and a thermoplastic polymer film extruded thereon, said pigmented adhesive layer comprising an adhesive derived from a crosslinkable vinylpolymer and a crosslinker therefor, containing at least one pigment selected from the group consisting of koalin clay, titanium dioxide, mistures thereof and mixtures or koalin clay, titanium dioxide or both with up to 50% by weight of aluminum hydroxide, the pigment and the adhesive being present in a ratio between 85:15 and 70:30 on a solid weight basis said pigmented layer being present on the paperboard substrate in an amount in the range from 10 to 30 g/m$^2$ of said paperboard substrate, said ovenable paperboard retaining a brightness of at least 45% after exposure to 250° C. or 20 minutes and an adhesion strength of at least 40 g/15 mm between said pigmented adhesive layer and said thermoplastic film.

2. An ovenable paperboard according to claim 1, wherein the adhesive contained in said pigmented adhesive layer is derived from a combination of crosslinkable ethylenevinylacetate copolymer emulsion and a crosslinker therefor.

3. An ovenable paperboard according to claim 1, wherein the adhesive contained in said pigmented adhesive layer is derived from crosslinkable acrylate emulsion and water-soluble polyamidepolyurea, in a mixing ratio of crosslinkable acrylate to polyamidepolyurea in the range of 85/15 to 70/30 on solid weight basis.

4. An ovenable paperboard according to claim 1, wherein the pigmented adhesive layer is adhered to laminating polyethyleneterephthalate with a peeling strength not less than 70 g/15 mm.

5. An ovenable paperboard according to claim 1, wherein the laminating thermoplastic polymer is polyethyleneterephthalate or polymethylpentene which is extrusion laminated on the pigmented adhesive layer.

6. A coated paperboard consisting essentially of a paper substrate and a pigmented adhesive layer, the pigmented adhesive layer comprising kaolin clay or titanium dioxide, a mixture thereof or a mixture of kaolin clay, titanium dioxide or both with up to 50% by weight of aluminum hydroxide, the pigment and the adhesive being present in a ratio between 85:15 to 70:30 on a solid weight basis, the pigmented adhesive layer being coat-rated in the range of 10 g to 30 g/m$^2$ paper, and the adhesive being derived from a crosslinkable vinylpolymer and a crosslinker therefor.

7. An ovenable food container having flange part consisting essentially of the substrate paper, intermediate pigmented adhesive layer and laminating unpigmented polyethyleneterephthalate film, characterized in that the brightness at the flange part remains at least 45% of the same after the heat-treatment of 250 ° C. for 20 minutes.

8. A paperboard container for cooking food comprising an ovenable paperboard formed into the shape of a container having a frange part, said container comprising:
   (a) an outside surface comprising a paperboard substrate;
   (b) an intermediate pigmented adhesive layer comprising an emulsion of adhesive derived from a crosslinkable vinylpolymer and a crosslinker therefor, at least one pigment selected from the group consisting of koalin clay, titanium dioxide, mixtures thereof and mixtures of koalin clay, titanium dioxide or both with up to 50% by weight of aluminum hydroxide, the pigment and the adhesive being present in a ratio between 85:15 to 70:30 on a solid weight basis, said pigmented adhesive layer being present on said paperboard substrate in an amount in the range from 10 to 30 g/m$^2$ of said paperboard substrate; and
   (c) an inside surface comprising a film of polyethyleneterephthalate or polymethylpentene extruded onto said pigmented adhesive layer, said frange part of said paperboard container retaining a brightness of at least 45% after exposure to 250° C. for 20 minutes.

9. A process for producing an ovenable paperboard comprising: applying a coating comprising a pigment and an emulsion of adhesive dispersed in water to a paperboard substrate so as to provide a coating surface with a coat weight in the range of from 10 to 30 g/m$^2$ after drying, and applying extrusion laminate of polyethyleneterephthalate or polymethylpentene on said coating surface, without subjecting the coating surface to super-calendering, said pigment being selected from the group consisting of koalin clay, titanium dioxides, mixtures thereof and mixtures of koalin clay, titanium diodide, or both with up to 50% by weight of aluminum hydroxide, said adhesive being selected from the group consisting of combinations of crosslinkable ethylenevinylaceate copolymer emulsion with a crosslinker therefor and crosslikable acrylate copolymer emulsion with a crosslinker of water-soluble polyamidepolyurea, said corsslinkable vinyl-copolymer and crosslinker being present in a ratio within the range of 85/15 to 70/30 on a solid weight basis, and the pigment and adhesive being present in a ratio within the range of 85/15 to 70/30 on a solid weight basis.

* * * * *

UNITED STATES PATENT AND TRADEMARK OFFICE
CERTIFICATE OF CORRECTION

PATENT NO. : 4,543,280

DATED : September 24, 1985

INVENTOR(S) : FUJITA, Yuji et al

It is certified that error appears in the above-identified patent and that said Letters Patent is hereby corrected as shown below:

Claim 1, Column 11, lines 18 and 19, delete "koalin" and substitute -- kaolin --.

Claim 1, Column 11, line 27, delete "or" and substitute -- for --.

Claim 8, Column 12, lines 20 and 21, delete "koalin" and substitute -- kaolin --.

Claim 9, Column 12, lines 44 and 45, delete "koalin" and substitute -- kaolin --.

Claim 9, Column 12, line 50, delete "crosslikable" and substitute -- crosslinkable --.

Claim 9, Column 12, line 52, delete "corsslinkable" and substitute -- crosslinkable --.

Signed and Sealed this

Eighteenth Day of February 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,543,280

DATED : September 24, 1985

INVENTOR(S) : FUJITA, Yuji et al

It is certified that error appears in the above-identified patent and that said Letters Patent is hereby corrected as shown below:

Claim 1, column 11, line 19, "mistures" should read -- mixtures -- and "or" should read -- of --.

Claim 9, column 12, line 46, "diodide" should read -- dioxide --.

Signed and Sealed this

Eighth Day of April 1986

[SEAL]

Attest:

DONALD J. QUIGG

Attesting Officer

Commissioner of Patents and Trademarks